US007701410B2

United States Patent
Li et al.

(10) Patent No.: US 7,701,410 B2
(45) Date of Patent: Apr. 20, 2010

(54) DUAL-MODE ANTENNA DEVICE

(75) Inventors: Er-Wei Li, Shenzhen (CN); Yan-Ling Pan, Shenzhen (CN); Cho-Ju Chung, Taipei Hsien (TW); Chong Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 12 days.

(21) Appl. No.: 12/195,400

(22) Filed: Aug. 20, 2008

(65) Prior Publication Data

US 2009/0262042 A1   Oct. 22, 2009

(30) Foreign Application Priority Data

Apr. 21, 2008   (CN)   ........................... 200820300594

(51) Int. Cl.
*H01Q 3/24* (2006.01)
(52) U.S. Cl. ........................ 343/876; 455/277.1; 455/73
(58) Field of Classification Search .......... 343/700 MS, 343/702, 876; 455/277.1, 272, 73, 103, 552.1
See application file for complete search history.

(56) References Cited

U.S. PATENT DOCUMENTS

| 5,913,153 | A | * | 6/1999 | Nakamoto et al. | ............ 455/78 |
| 6,978,121 | B1 | * | 12/2005 | Lane et al. | .................... 455/73 |
| 2004/0038660 | A1 | * | 2/2004 | He et al. | .................. 455/277.1 |
| 2005/0009586 | A1 | * | 1/2005 | Mori | ....................... 455/575.7 |

FOREIGN PATENT DOCUMENTS

CN         1741484 A       3/2006

* cited by examiner

*Primary Examiner*—HoangAnh T Le
(74) *Attorney, Agent, or Firm*—Frank R. Niranjan

(57) ABSTRACT

A dual-mode antenna device (20) includes a wireless module (207) and a second wireless module (208) transceiving signals of a first wireless network signal and a second wireless network. A first antenna (201) and a second antenna (202) transceive the signals, respectively. A first switch (203) is connected to the first antenna and a second switch (204) is connected to the second antenna. A third switch (205) is connected to the first switch, the second switch and the first wireless network module. A fourth switch (206) is connected to the first switch, the third switch and the second wireless network module. The first, third, and fourth switches collaboratively select the first antenna to transmit the wireless network signals. The second, third, and fourth switches collaboratively select the second antenna to transmit the wireless network signals.

11 Claims, 7 Drawing Sheets

DUAL-MODE ANTENNA DEVICE

BACKGROUND

1. Field of the Invention

The present disclosure relates to signal transmission, and particularly to a dual-mode antenna device.

2. Description of Related Art

Most portable devices, such as notebooks, typically have a WiFi network card and a Bluetooth network card, allowing them to transceive WiFi or Bluetooth signals. However, each of the network cards needs an individual antenna to transmit and receive corresponding signals.

FIG. 7 is a schematic diagram of a notebook 10 with WiFi and Bluetooth functions. The notebook 10 comprises two WiFi antennas 101a and 101b, a WiFi network card 102, a Bluetooth antenna 103 and a Bluetooth network card 104. The WiFi antennas 101a, 101b and the Bluetooth antenna 103 are deployed respectively, and correspondingly connect to the WiFi network card 102 and the Bluetooth network card 104.

As described, the notebook 10 requires an additional antenna to support the Bluetooth function, which is prone to noise interference, large, and expensive. With continued demand for reduced portable device size, integration of the WiFi and Bluetooth network cards is a growing trend, one which the design of the antennas in the notebook 10 cannot satisfy.

SUMMARY

A dual-mode antenna device comprises a first wireless module and a second wireless module for transceiving signals complying with respective first and second wireless networks. First and second antennae transceive the signals, respectively. A first switch is connected to the first antenna. A second switch is connected to the second antenna. A third switch is connected to the first switch, the second switch and the first wireless network module. A fourth switch is connected to the first switch, the third switch and the second wireless network module. The first, third, and fourth switches collaboratively select the first antenna to transmit the wireless network signals. The second, third, and fourth switches collaboratively select the second antenna to transmit the wireless network signals.

Other objectives, the advantages and novel features of the present invention will become more apparent from the following detailed description of preferred embodiments when taken in conjunction with the accompanying drawings, in which:

DETAILED DESCRIPTION OF CERTAIN INVENTIVE EMBODIMENTS

Figure 1:
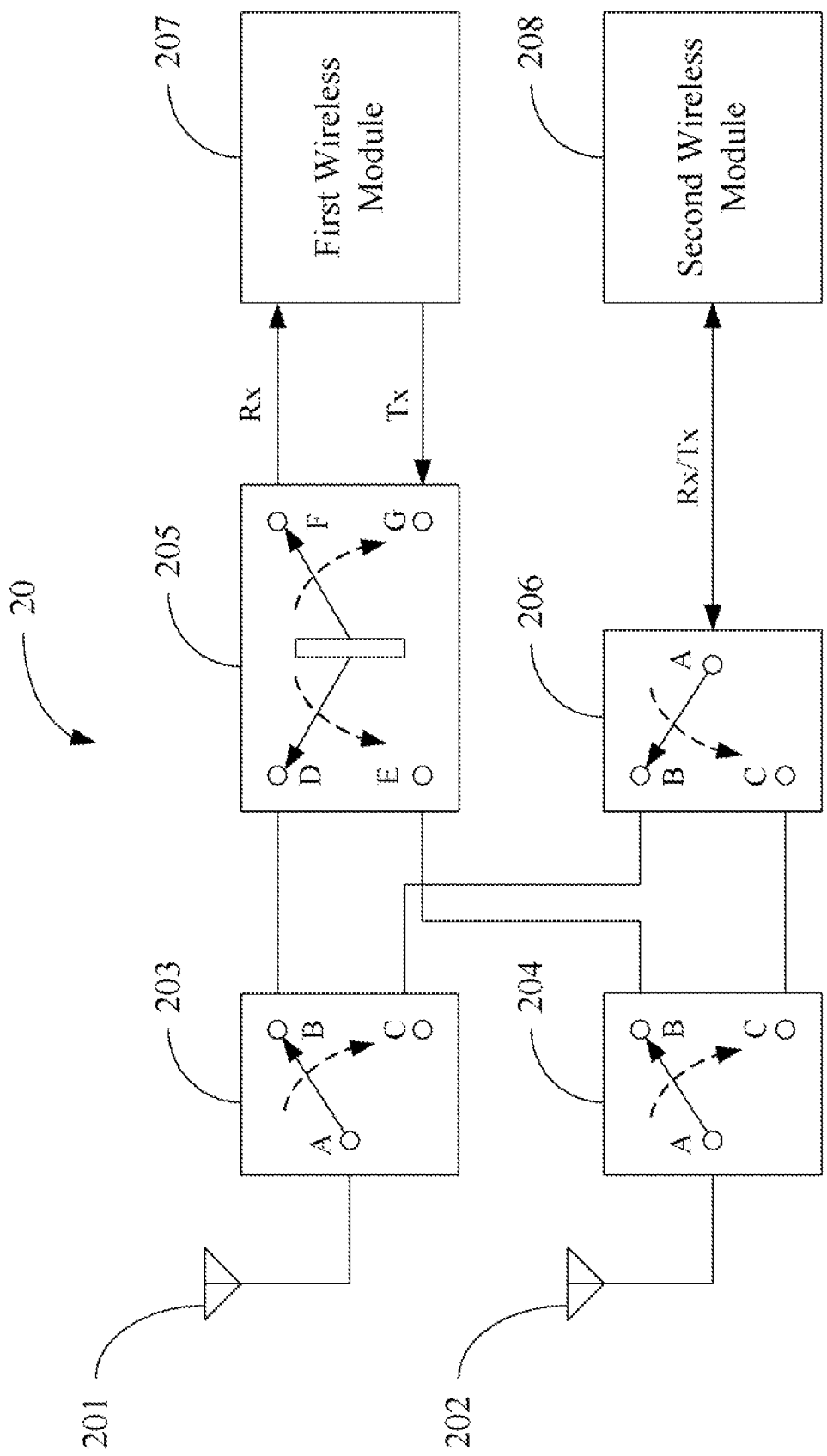
FIG. 1 is a schematic diagram of an embodiment of a dual-mode antenna device of the present disclosure.

FIG. 1 is a schematic diagram of one embodiment of a dual-mode antenna device 20 of the present disclosure. The dual-mode antenna device 20 comprises a first antenna 201, a second antenna 202, a first switch 203, a second switch 204, a third switch 205, a fourth switch 206, a first wireless module 207 and a second wireless module 208.

In this embodiment of the present disclosure, the first wireless module is a Wireless Local Area Network (WLAN) module transceiving signals of the first wireless network, such as WiFi signals. The second wireless module is a Bluetooth module transceiving signal of the second wireless network, such as Bluetooth signals. The first switch 203, the second switch 204 and the fourth switch 206 are Single-pole Double Throw (SPDT) Switches, each of which has a common pole A, a first throw pole B and a second throw pole C. The third switch 205 is a Double-pole Double Throw (DPDT) Switch, which has a first throw pole D, a second throw pole E, a third throw pole F and a fourth throw pole G.

The first antenna 201 and the second antenna 202 transceive signals complying with the first wireless network and the second wireless network. In other words, the first antenna 201 and the second antenna 202 transceive both WiFi signals and Bluetooth signals.

In the embodiment of the present disclosure, the first switch 203 is connected to the first antenna 201, selectively relaying signals of the first wireless network and the second wireless network. The second switch 204 is connected to the second antenna 202, selectively relaying signals of the first wireless network and the second wireless network. The third switch 205 is commonly connected to the first switch 203, the second switch 204 and the first wireless module 207, bridging the first switch 203 and the second switch 204 to the first wireless module 207. The fourth switch 206 is commonly connected to the first switch 203, the second switch 204, and the second wireless module 208, bridging the first switch 203 and the second switch 204 to the second wireless module 208.

The first switch 203, the third switch 205 and the fourth switch 206 collaboratively select the first antenna 201 to transmit signals of the first wireless network and the second wireless network to the first wireless module 207 or the second wireless module 208. The second switch 204, the third switch 205 and the fourth switch 206 collaboratively select the second antenna 202 to transmit signals of the first wireless network and the second wireless network to the first wireless module 207 or the second wireless module 208.

Specifically, the common pole A of the first switch 203 is connected to the first antenna 201, and the first throw pole B of the first switch 203 is connected to the first throw pole D of the third switch 205. The common pole A of the second switch 204 is connected to the second antenna 202, and the first throw pole B of the second switch 204 is connected the second throw pole E of the third switch 205. The third throw pole F and the fourth throw pole G of the third switch 205 are connected to the first wireless module 207. The first throw pole B of the fourth switch 206 is connected to the second throw pole C of the first switch 203. The second throw pole C of the fourth switch 206 is connected to the second throw pole C of the second switch 204. The common pole A of the fourth switch 206 is connected to the second wireless module 208.

In this embodiment of the present disclosure, WiFi signals are preset to a higher priority. The common pole A of the first switch 203 connects to the second throw pole B thereof, the original state of the first switch 203. Similarly, the common pole A of the second switch 204 connects to the second throw pole B thereof, also an original state of the second switch 204 before the WiFi signals and Bluetooth signals have been transmitted by the first antenna 201 and the second antenna 202. When the WiFi signals and Bluetooth signals are transmitted simultaneously, WiFi signals take priority and are processed first. Specifically, the dual-mode antenna device 20 compares the signal strength of the first antenna 201 and the second antenna 202 in order to choose the antenna with stronger signal strength to transmit the WiFi signals.

Figure 2:
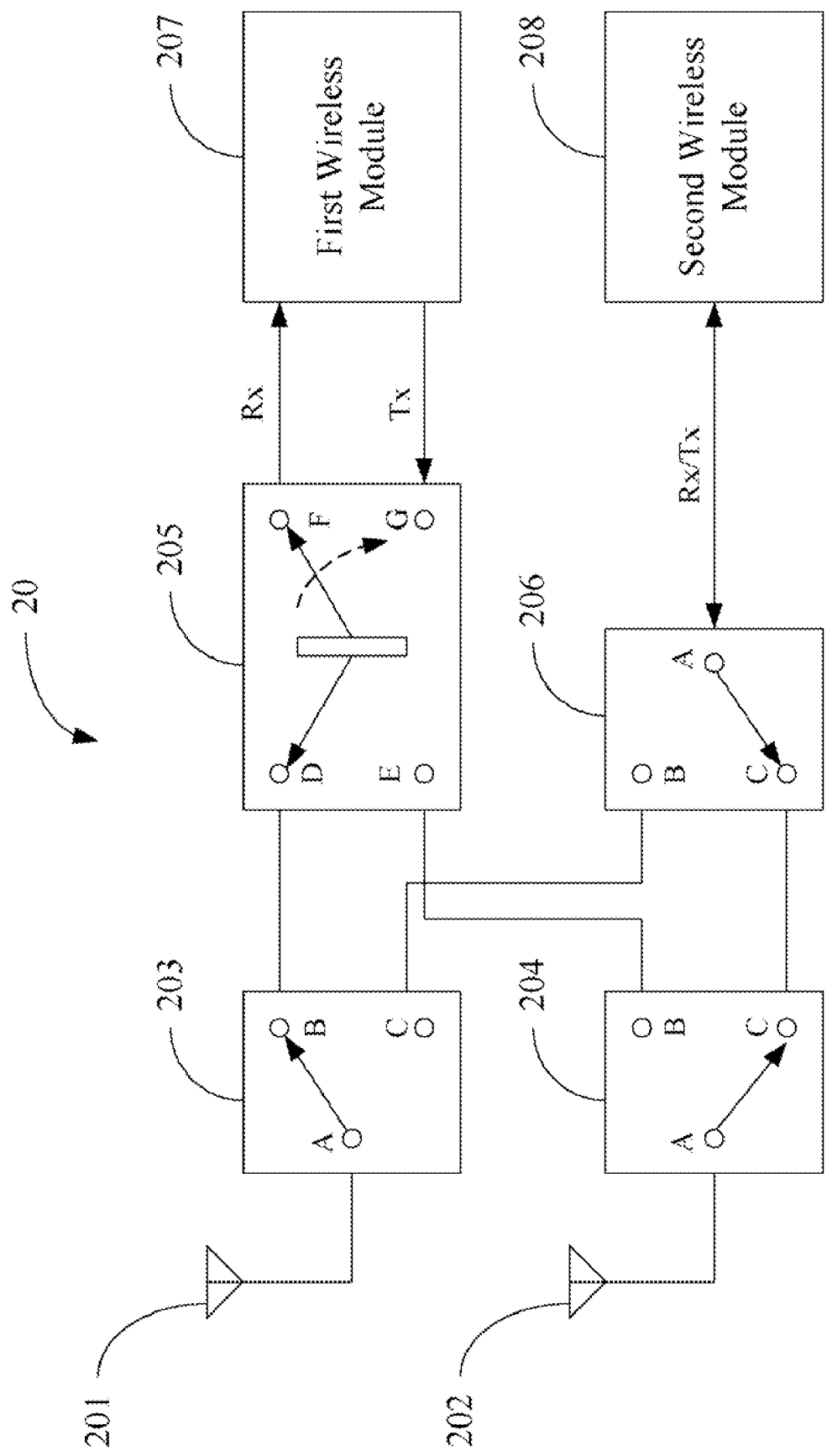
FIG. 2 is a schematic diagram of the embodiment of a dual-mode antenna device of FIG. 1 receiving WiFi signals via the first antenna.

For example, also referring to FIG. 2 is a schematic diagram of receiving WiFi signals via the first antenna 201 of FIG. 1. When the first antenna 201 is chosen to transmit the WiFi signals, the first switch 203 maintains its original state, and the first throw pole D of the three switches 205 can be connected. Whether or not the third throw pole F or the fourth throw pole G thereof is connected is dependent on the transmission states of the WiFi signals. Specifically, the third throw pole F of the third switch 205 is connected when the first antenna 201 receives the WiFi signals. Contrarily, the fourth throw pole G of the third switch 205 is connected when the first antenna 201 sends the WiFi signals. In an embodiment of the present invention, if the first antenna 201 is chosen to transmit WiFi signals, the second antenna 202 receives Bluetooth signals. The common pole A of the second switch 204 is connected to the second throw pole C thereof, and the common pole A of the fourth switch 206 is connected to the second throw pole C thereof. Therefore, the second wireless module 208 can transmit Bluetooth signals via the second antenna 202, the second switch 204 and the fourth switch 206.

Figure 3:
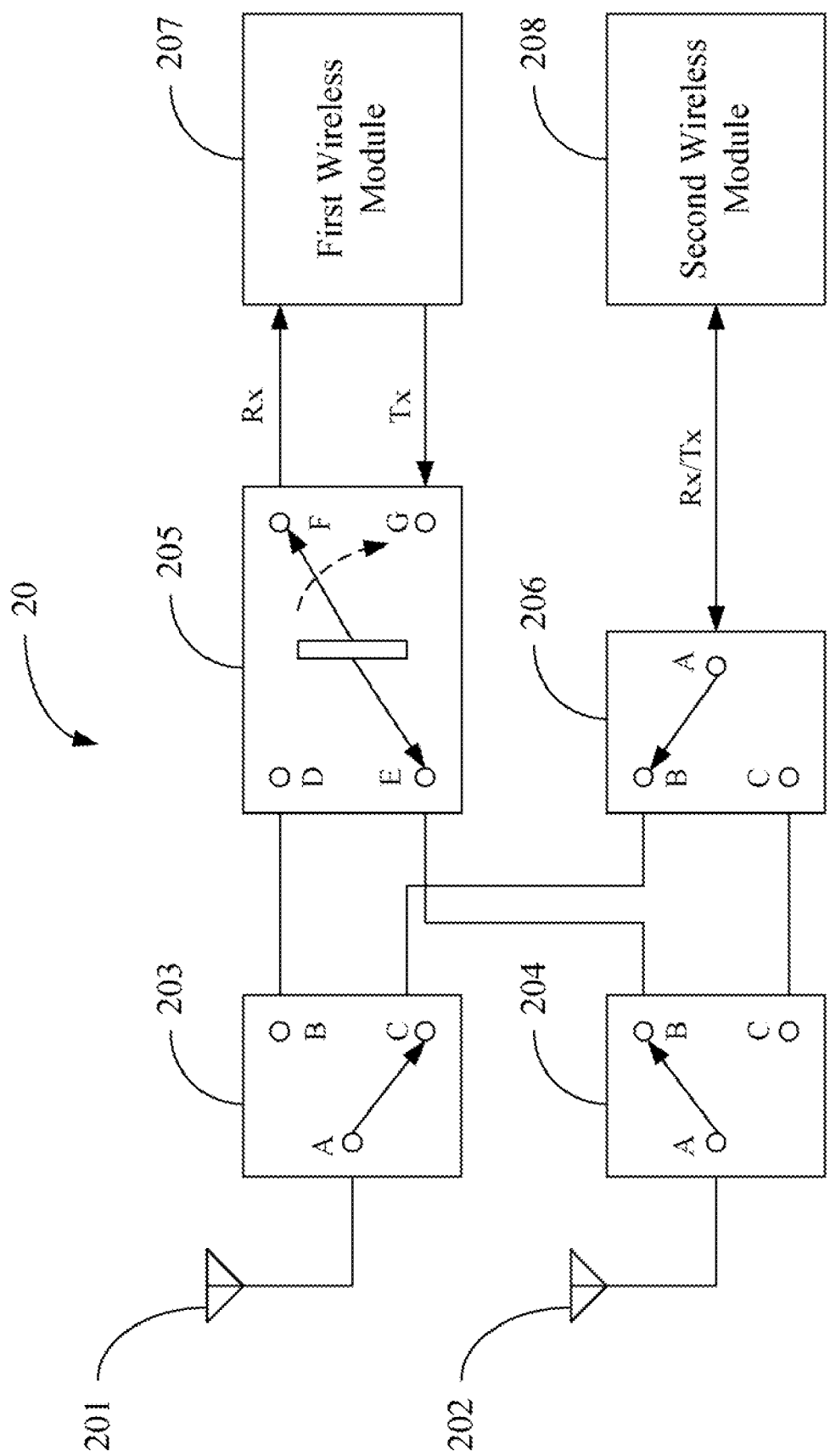
FIG. 3 is a schematic diagram of the embodiment of a dual-mode antenna device of FIG. 1 receiving WiFi signals via the second antenna.

On the other hand, referring to FIG. 3 is a schematic diagram of receiving WiFi signals via the second antenna 202 of FIG. 1. If the second antenna 202 receives WiFi signals, the second switch 204 maintains its original state. The second throw pole E of the third switch 205 can be connected, while the third throw pole F or the fourth throw pole G thereof is selectively connected at the same time. Thus, the first wireless module 207 can transmit WiFi signals via the second switch 204, the third switch 205 and the second antenna 202. At the same time, the common pole A of the first switch 203 is connected to the second throw pole C thereof, and the common pole A of the fourth switch 206 is connected to the first throw pole B thereof. Thus, the second wireless module 208 can transmit Bluetooth signals via the first switch 203, the fourth switch 206 and the first antenna 201.

Figure 4:
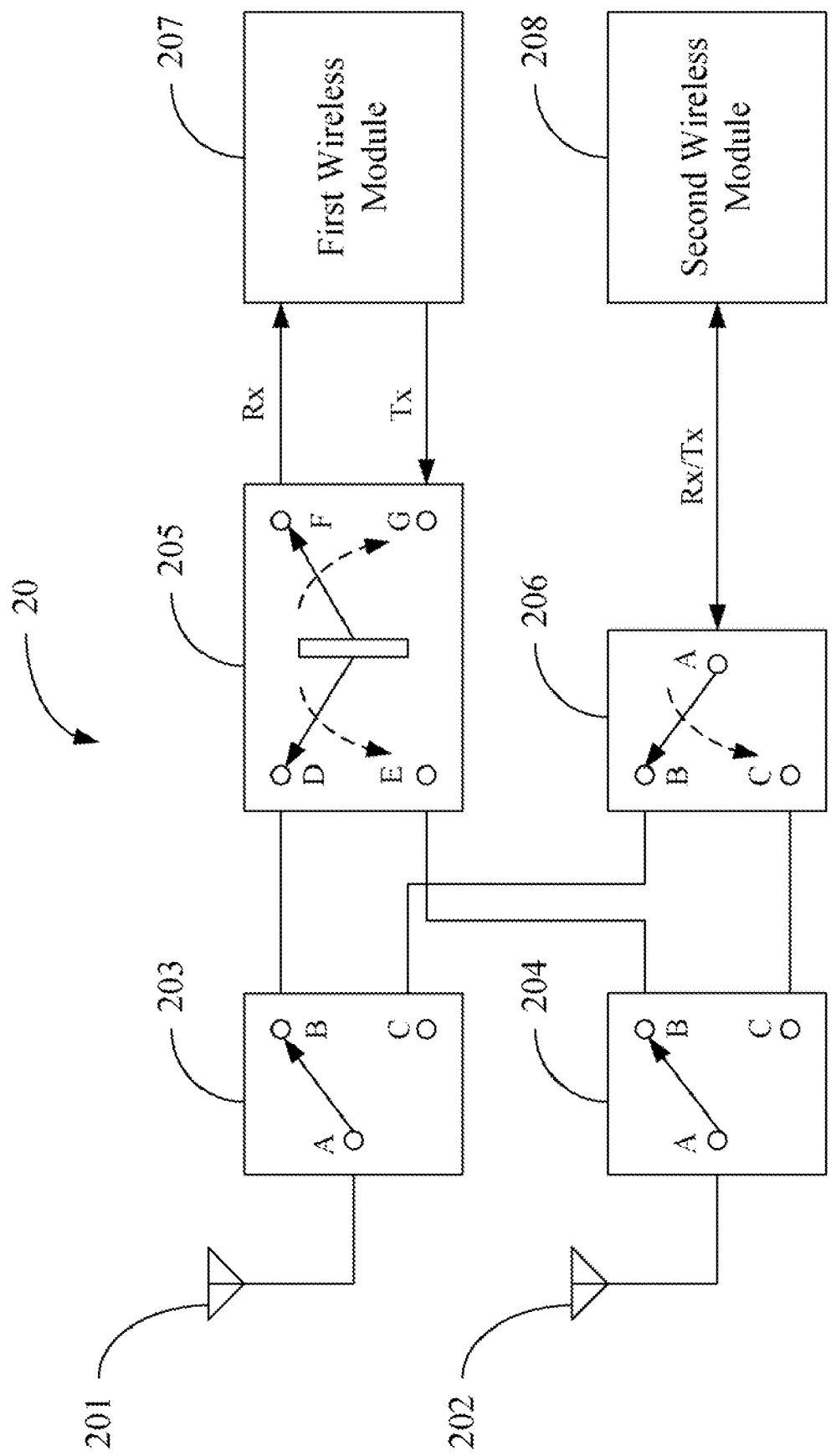
FIG. 4 is a schematic diagram of the embodiment of a dual-mode antenna device of FIG. 1 transmitting WiFi signals.

FIG. 4 is a schematic diagram of transmitting WiFi signals of FIG. 1, if only WiFi signals are transmitted at any given time. The first switch 203 and the second switch 204 maintain their original state, and the first throw pole D or the second throw pole E of the third switch 205 is selectively connected based on the WiFi signal strength transmitted by the first antenna 201 and the second antenna 202. Similarly, the third throw pole F or fourth throw pole G of the third switch 205 is selectively connected, and the common pole A of the fourth switch 206 is selectively connected to the first throw pole B or the second throw pole C thereof.

Figure 5:
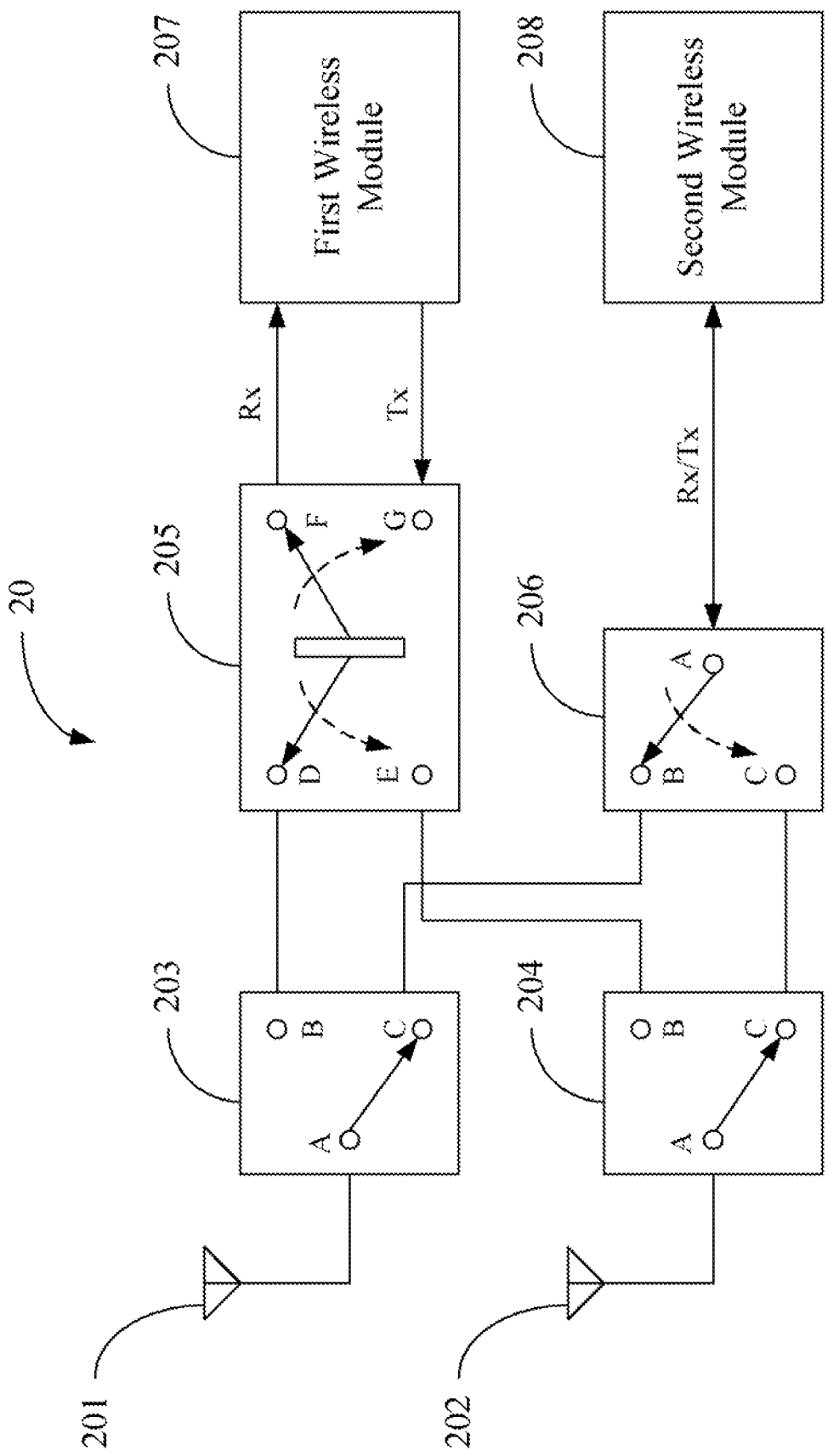
FIG. 5 is a schematic diagram of the embodiment of a dual-mode antenna device of FIG. 1 transmitting Bluetooth signals.

If only Bluetooth signals are transmitted at any given time, referring to FIG. 5, the common pole A of the first switch 203 is connected to the second throw pole C thereof, and the common pole A of the second switch 204 is similarly connected to the second throw pole C thereof. The first throw pole D or the second throw pole E of the third switch 205 is selectively connected. Similarly, the third throw pole F or the fourth throw pole G thereof is selectively connected. At the same time, the common pole A of the fourth switch 206 is selectively connected to the first throw pole B or the second throw pole C thereof, in order to transmit Bluetooth signals via the first antenna 201 or the second antenna 202.

Figure 6:
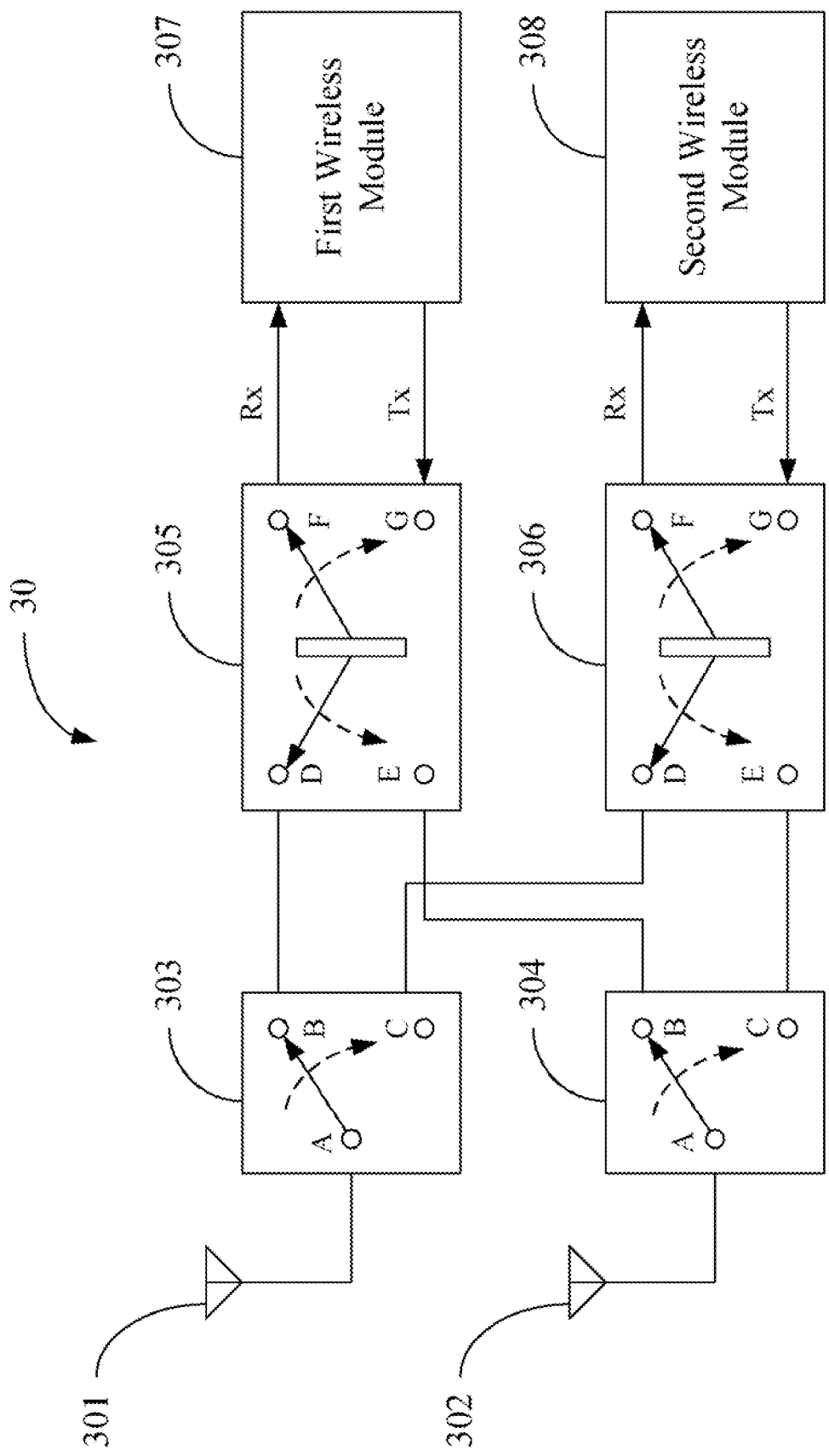
FIG. 6 is a schematic diagram of another embodiment of a dual-mode antenna device of the present disclosure.
Figure 7:
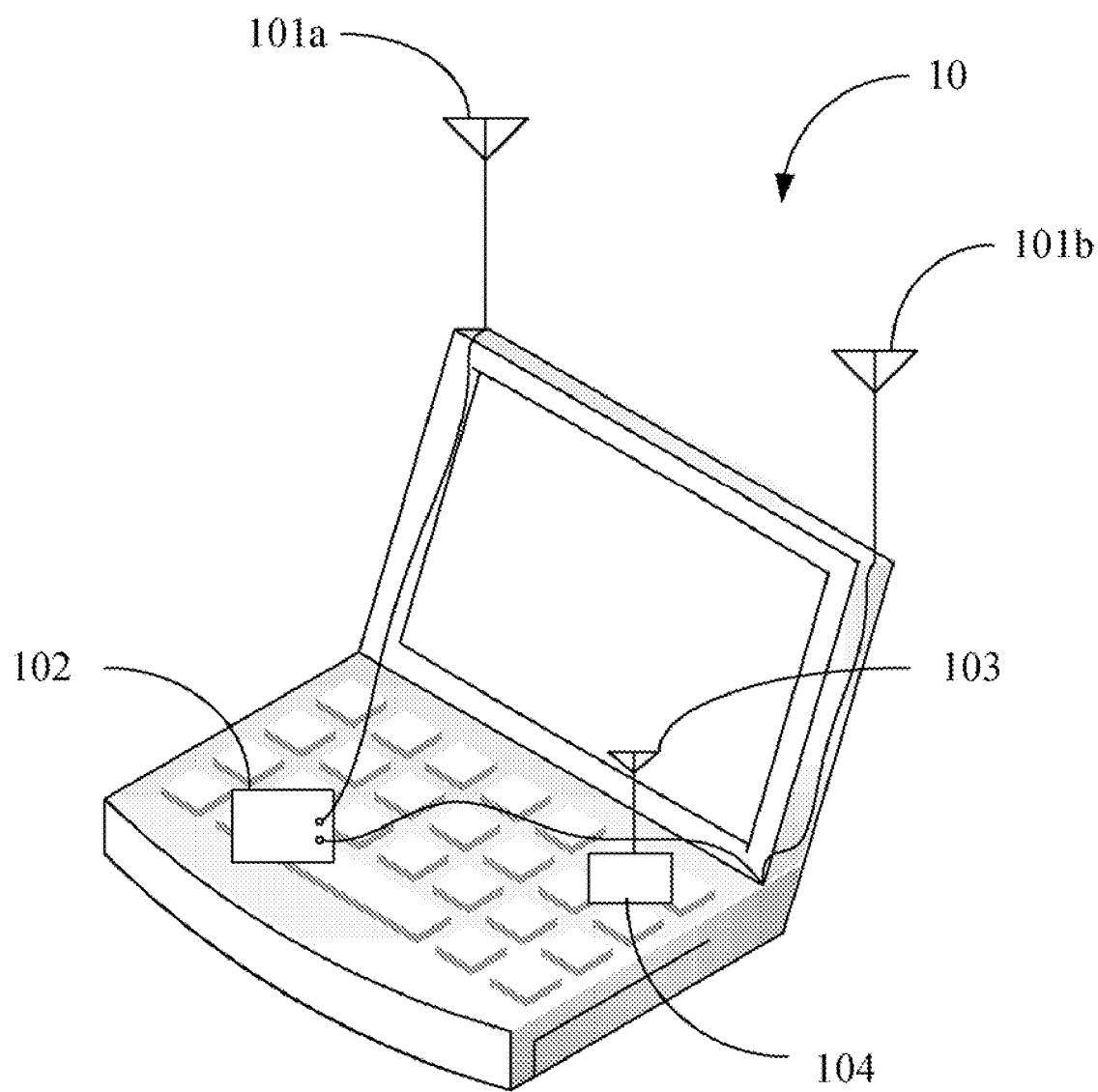
FIG. 7 is a schematic diagram of a notebook with WiFi and Bluetooth functionality.

In the present invention, the dual-mode antenna device 20 also can transmit WiFi signals and WiMAX signals. FIG. 6 is a schematic diagram of a dual-mode antenna device 30 of another embodiment of the present disclosure, differing from the previous embodiment only in that the second wireless module 308 is a WiMAX module and the fourth switch 306 is DPDT. The first throw pole D of the fourth switch 306 is connected to the second throw pole C of the first switch 303, the second throw pole E thereof is connected to the second throw pole C of the fourth switch 204, and the third throw pole F and the fourth throw pole D can be selectively connected to the second wireless module 308. Therefore, the dual-mode antenna device 30 can transmit WiFi signals and WiMAX signals via the first antenna 301 and the second antenna 302.

In the present invention, the dual-mode antenna device uses two original antennas and a plurality of switches to transmit different wireless signals, thereby decreasing unit size and avoiding noise interference.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A dual-mode antenna device comprising a first wireless module and a second wireless module, transceiving signals complying respectively with a first wireless network and a second wireless network, the dual-mode antenna device comprising:
    a first antenna, transmitting signals complying with the first wireless network and the second wireless network;
    a second antenna, transmitting signals complying with the first wireless network and the second wireless network;
    a first switch connected to the second antenna, selectively relaying signals of the first wireless network and the second wireless network;
    a second switch connected to the second antenna, selectively relaying signals of the first wireless network and the second wireless network;
    a third switch connected to the first switch, the second switch and the first wireless module, bridging the first switch and the second switch to the first wireless module; and
    a fourth switch connected to the first switch, the second switch and the second wireless module, bridging the first switch and the second switch to the second wireless module;
    wherein the first switch, the third switch and the fourth switch collaboratively select the first antenna to transmit signals to the first wireless module or the second wireless module; and the second switch, the third switch and the fourth switch collaboratively select the second antenna to transmit signals to the first wireless module or the second wireless network.

2. The dual-mode antenna device as claimed in claim 1, wherein the first switch and the second switch are both Single-Pole Double Throw (SPDT) Switches, each of which comprises a common pole, a first throw pole, and a second throw pole.

3. The dual-mode antenna device as claimed in claim 2, wherein the common pole of the first switch is connected to the first antenna.

4. The dual-mode antenna device as claimed in claim 3, wherein the common pole of the second switch is connected to the second antenna.

5. The dual-mode antenna device as claimed in claim 4, wherein the third switch is a Double-Pole Double Throw (DPDT) Switch comprising a first throw pole, a second throw pole, a third throw pole, and a fourth throw pole; wherein the first throw pole of the third switch is connected to the first throw pole of the first switch; the second throw pole of the third switch is connected to the first throw pole of the second switch; and the third throw pole and the fourth throw pole of the third switch are connected to the first wireless module.

6. The dual-mode antenna device as claimed in claim 5, wherein the fourth switch is a SPDT switch comprising a common pole, a first throw pole, and a second throw pole; wherein the first throw pole of the fourth switch is connected to the second throw pole of the first switch; the second throw pole of the fourth switch is connected to the second throw pole of the second switch; and the common pole of the fourth switch is connected to the second wireless module.

7. The dual-mode antenna device as claimed in claim 5, wherein the fourth switch is a DPDT switch comprising a first throw pole, a second throw pole, a third throw pole, and a fourth throw pole; wherein the first throw pole of the fourth switch is connected to the second throw pole of the first switch; the second throw pole of the fourth switch is connected to the second throw pole of the second switch; and the third throw pole and the fourth throw pole of the fourth switch are connected to the second wireless module.

8. The dual-mode antenna device as claimed in claim 1, wherein the first wireless module is a Wireless Local Area Network (WLAN) module.

9. The dual-mode antenna device as claimed in claim 8, wherein the second wireless module is a Bluetooth module.

10. The dual-mode antenna device as claimed in claim 8, wherein the second wireless module is a WiMAX module.

11. The dual-mode antenna device as claimed in claim 1, wherein the signals of the first wireless network are the highest priority.

* * * * *